Jan. 21, 1969    F. H. MIDDLETON    3,422,489
MULTI-CHANNEL STUFFING SYSTEM
Filed March 10, 1966    Sheet 2 of 2
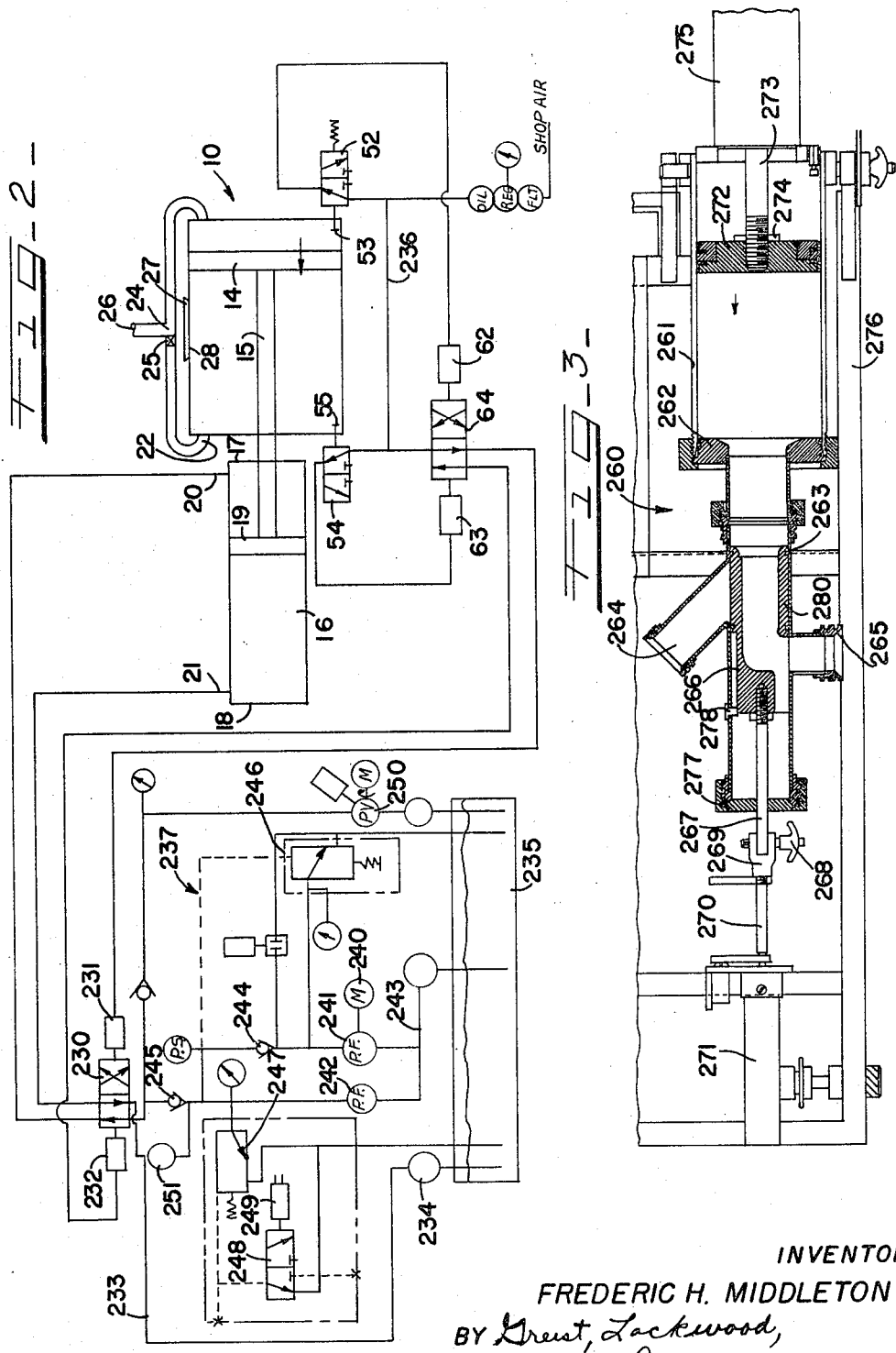
INVENTOR
FREDERIC H. MIDDLETON
BY Greist, Lockwood,
Greenawalt & Dewey   ATT'YS.

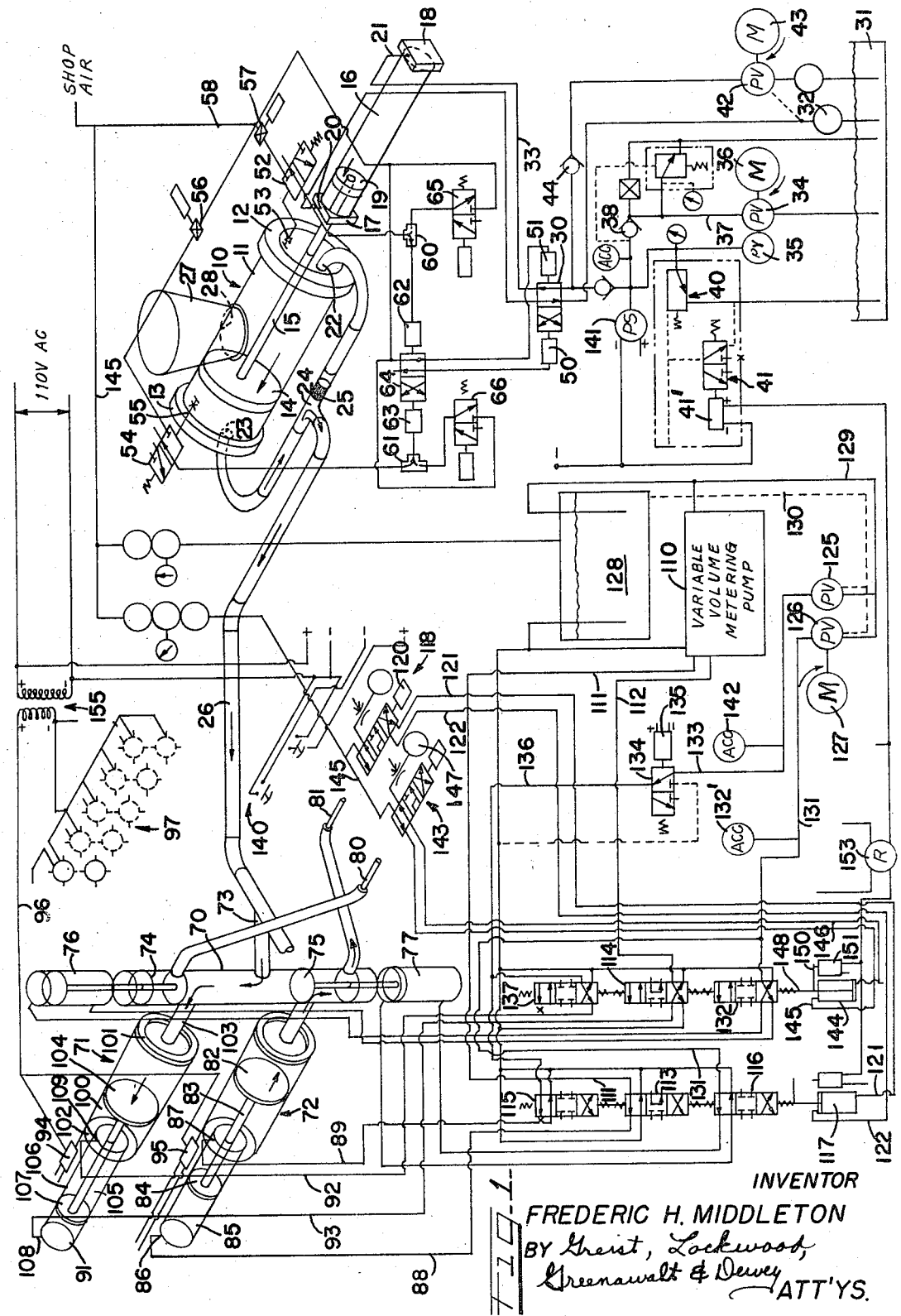

United States Patent Office 3,422,489
Patented Jan. 21, 1969

3,422,489
MULTI-CHANNEL STUFFING SYSTEM
Frederick H. Middleton, Madison, Wis., assignor to Oscar Mayer & Co., Inc., Chicago, Ill., a corporation of Illinois
Filed Mar. 10, 1966, Ser. No. 533,359
U.S. Cl. 17—35                        8 Claims
Int. Cl. A22c 11/02

ABSTRACT OF THE DISCLOSURE

A closed system for handling meat products and the like wherein a transfer pump which receives a meat product, such as pork sausage batter, is driven by a two-way hydraulic power cylinder in a hydraulic circuit having electro-pneumatic controls so as to advance the product upon demand through a manifold to a two-way meat valve which is adapted to alternately feed the product to a pair of meat cylinders constituting metering stuffer and to connect the discharge ports of the metering stuffers to stuffing horns for filling casings placed thereon, the operation of the meat valve and the stuffers being controlled by hydraulic power cylinders in a hydraulic circuit having electro-pneumatic controls which may be manually actuated to operate the apparatus for stuffing the casings simultaneously or alternatively at a predetermined and uniform rate. The system is adapted to be employed with some modification to operate a larger number of stuffers with a single transfer pump supplying the product.

---

This invention relates to food processing systems in general and more particularly is directed to a novel multi-channel stuffing system having a new and improved hydraulic transfer pump associated therewith. In the handling of food products, difficulty is experienced in processing and handling the same due to a number of factors, a principal one of which is the lack of homogeneity in the product. This is particularly true in meat products which may comprise a viscous batter, slurry of solids and/or semi-solid highly particulate food products which are particularly prone to smearing, sub-dividing and the like. In handling meat products such as pork sausage, luncheon meats, canned hams, and salami, extreme care must be exercised in handling to avoid break-down in their particulate definition. A problem of particular concern to the industry is the moving or pumping of materials without affecting their character or particulate definition. Smearing and undesirably affecting other critical properties during processing must be avoided if at all possible, while it is extremely desirable to feed the product into a package, skin or container at a uniform rate for accurate metering in order to reduce the high cost of excessive fill which is a common occurrence when metering is non-uniform.

The present system due to its unique design remains closed to the atmosphere throughout the grinding, handling and stuffing process thereby being more hygenic than prior art types since the products are not exposed or subject to contamination. The handling equipment is highly accurate during feeding and as will be seen is designed to reduce any tendency to smear or for particles to sub-divide, but yet is simply enough constructed to permit unskilled clean-up personnel to dis-assemble and re-assemble the same expeditiously and with little effort. The unique system control is a combination electo-pneumatic-hydraulic design which is not susceptible to damage during the clean-up period where large quantities of hot water and repeated daily soakings of the equipment are commonplace. While multiple stuffing channels are available, a single operation can conveniently attend to all channels and the extruded product is uniformly sized, that is, one in which the weight per unit length is substantially uniform to permit numerical packaging without any substantial loss through overweight.

The multi-channel stuffing system to be described in detail below will be considered in conjunction with a novel transfer pump of unique design which reduces smearing of food products. The pump design is such that it may be readily disassembled and cleaned while providing very accurate metering rates at low, medium and high pressures. The pump of the present invention is driven by a two-way hydraulic power cylinder in conjunction with a novel hydraulic circuit which provides driving fluid to cause the pump to extrude the product at a relatively constant rate and continuously pump until the supply of motive fluid is cut off. The control circuit serving the pump utilizes air controls to permit liberal use of water in clean-up operations without fear of electrical hazard or disabling the equipment. The air controls operate a main hydraulic control valve which supplies fluid to the motor driving the pump. Because of the location of the pump relative to the motor, leakage of the hydraulic fluid does not present a problem. In any event, a hyraulic fluid such as an edible pure white mineral oil may be used so that the food products will not be contaminated should contact occur. The actual moving parts of the pumping system which contact the food product are readily disassembled for easy clean-up and are of simplified construction to minimize pockets and voids thus permitting proper sanitization with minimum effort.

The present invention avoids the shortcomings of prior are designs not only from the ease of maintenance and manufacturing of the processing equipment but also by providing a design which will readily form a uniform product with little or no smearing, sub-dividing of the particles or the like.

It is an object of this invention to provide a new and improved system for handling food products such as meat and the like in a closed system so as to protect the food product from contamination.

It is a further object of this invention to provide a multi-channel metering system which may be operated by a single operator and due to its simplified design may be easily constructed and maintained.

Another object of the invention is to provide a new and improved multi-channel metering system which will consistently produce a uniformly sized product permitting packaging for sale by counting units rather than by weight.

A further object of the invention is to provide a new and improved transfer pump particularly adapted for use in the pumping of viscous batters, solids and semi-solids in a manner so as to reduce particulate sub-division, smearing, bridging and the like.

It is a further object of this invention to provide a new and improved multi-channel metering system in which a novel control arrangement is provided to feed meat products and the like into packages, casings and the like at a uniform rate.

Other objects and advantages of the present invention will become apparent upon consideration of the following description and the accompanying drawings wherein:

FIG. 1 is a schematic view of a multi-channel stuffing system embodying the principles of the present invention;

FIG. 2 is a schematic view of the transfer pump shown in FIG. 1 and illustrating one form of control circuit; and FIG. 3 is a cross sectional view of a typical stuffing cylinder with the fluid motor driving the same shown fragmentarily.

In FIG. 1, a schematic perspective view of the transfer pump used in the multi-channel stuffing system of the present invention is illustrated and includes a transfer pump 10 having a cylindrical body 11 closed off at opposite ends by end plates 12 and 13. A piston head 14 is mounted within the cylindrical body for reciprocation between limits defined by the end plates 12 and 13. A piston rod 15 extends through the end plate 12 and through an end plate 17 of a two-way hydraulic cylinder 16 for attachment to a piston head 19. An end plate 18 closes off the opposite end of the cylinder 16. The piston head 19 reciprocates in the cylinder 16 between limits defined by the end plates 17 and 18 under the influence of hydraulic fluid entering and leaving the ports 20 and 21.

The transfer pump 10 has outlets 22 and 23 extending from the end plates 12 and 13 and connected by a central T-shaped fitting 24 containing a reciprocating shuttle valve 25. The base of the T-shaped fitting 24 is joined to an elongated manifold 26 which distributes the pumped product to metering stuffers.

A pump inlet is shown at 27 having a throat 28 which communicates through the side of the cylinder 11 between the end plates 12 and 13. A vacuum grinder of conventional form (not shown) feeds the ground product into the inlet throat 27. Once the product enters the vacuum grinder, it remains isolated from contact with the atmosphere until after stuffing is completed, inasmuch as the system is closed. The product under the influence of gravity falls through the throat 28 into the center of the cylinder from the inlet 27 so that when the piston 14 is travelling back and forth, material dropping from the inlet 27 on either side of the piston will be trapped when the piston passes the throat 28. Further axial movement of the piston 14 into closer proximity to either end plate 12 or 13 forces material out the discharge lines or outlets 22 and 23, through the T-shaped fitting 24 to the manifold 26 for selective distribution to the individual metering stuffers.

Depending upon the direction of movement of the piston 14, the shuttle valve 25 will block one of the outlets 22 and 23 to direct the flow from the unblocked outlet into the manifold 26. The shuttle valve 25 is trapped within the T-shaped fitting 24 for reciprocation between fixed limits defined by removable stops positioned at the connection with outlets 22 and 23. This shuttle valve design permits easy dis-assembly for clean-up and is virtually maintenance-free because in effect, only one moving part is required.

The transfer pump 10 is reciprocated by the fluid motor or hydraulic cylinder 16 which is driven by hydraulic fluid fed through the ports 20 and 21 via an air controlled four-way hydraulic valve 30. The pump control valve 30 is illustrated as having the inlet feeding hydraulic fluid to the port 21 while fluid is being exhausted through the port 20 to a sump tank 31 via a filter 32. The hydraulic fluid is supplied through the four-way pump control valve 30 to the port 21 via line 33 from tandem pumps 34 and 35 driven by common motor 36. Pump 34 is a large capacity fixed volume, low pressure vane-type pump having a main function of providing a rapid traverse of the piston 19 from one end of the cylinder to the other. Pump 34 is connected through line 37 containing a check valve 38 to the pump control valve 30. A pump 35 is tandem mounted with pump 34 and is a small capacity fixed volume high pressure vane type pump capable of supplying fluid at pressures of the order of 2,000 p.s.i. While the pump 35 will assist in a rapid traverse, its main function is to provide the requisite pressure to force the piston head 14 to its destination to perform the pumping function. Protection for the pump 35 is provided by a bypass relief valve 40, operated by a solenoid valve 41 which is electrically connected into the system in a manner to be described.

A third pump 42 is driven by an electric motor 43 and feeds hydraulic fluid drawn from the tank 31 through a check valve 44 and the hydraulic pump control valve 30. The pump 42 has a lower capacity being a pressure compensated low pressure vane-type pump which maintains a moderate pressure on the piston 19 which in turn applies a steady pressure on the product when no demand for material exists. When no demand exists for hydraulic fluid from the pumps 34 and 35, the fluid is normally bypassed to the tank 31 through the relief valve 40. When the solenoid 41 is energized, the relief valve 40 closes and the pumps provide hydraulic fluid under pressure through the four-way valve 30 to the appropriate end of the cylinder to cause piston movement.

The four-way hydraulic valve 30 is operated by air or pilot cylinders 50 and 51 which shifts the valve to change direction of the transfer pump 10. Air control was chosen because of the liberal usage of hot water during normal clean-up periods and to isolate the hydraulic fluid from the food products. An air pressure operated piston limit switch 52 is provided with a switch actuator probe 53 which extends through the end plate 12 and is adapted for contact by the piston head 14 as it approaches the end plate 12 during the pumping cycle. A similar limit switch 54 has an actuator probe 55 extending through the end plate 13 which is adapted to be contacted by piston head 14 at the opposite end of the pump cycle. Manually operated valves 56 and 57 control flow to each of the respective limit switches 52 and 54 from a filtered and regulated source of shop air being of the order of about 125 p.s.i. available through line 58. The line 58 may be adjusted to a suitable pressure level to prevent the internal pressure of the pump from actuating the respective probes 53 and 55.

Each of the switches 52 and 54 includes a three-way impulse micro air valve which on operation sends a signal through shuttle valves 60 and 61 respectively, to pilot cylinders 62 and 63 which operate a four-way air valve 64. The four-way air valve 64 will exhaust one pilot cylinder 50 while feeding the pressurized shop air into the pilot cylinder 51 to shift and control the position of the four-way hydraulic valve 30. In this manner, sufficient capacity is developed to control the main hydraulic valve 30 and change the direction of flow. Obviously, when probe 53 is energized, valve 64 will permit flow to energize pilot cylinder 50 and exhaust cylinder 51 causing the hydraulic flow pattern to change such that the hydraulic fluid is fed to port 20 while being exhausted from port 21 in the hydraulic cylinder 16. The three-way impulse valves 65 and 66 are provided for manual operation to permit valve shifting during assembly, dis-assembly and clean-up operations.

A meat valve 70 connects two metering stuffers or meat cylinders 71 and 72 to the manifold 26. The meat valve 70 is provided with a central inlet 73 joined to the manifold 26 and communicating midway between two spool-type valves 74 and 75. Each of the spool valves 74 and 75 is operated by a pilot cylinder 76 and 77, respectively, to control flow of the meat product into and out of each of the metering stuffers 71 and 72. The valves 74 and 75 are two position valves capable of being in the neutral position in which all parts are at rest, the stuffing position as shown by the position of the valve 75, or in the filling position as shown by valve 74.

Any number of metering stuffers may be connected to the manifold 26, and by operator control can selectively fill a plurality of casing simultaneously with a very high degree of accuracy in metering. Stuffing outlets on the meat valve 70 lead to stuffing horns 80 and 81 which receive the meat product from the metering stuffers 71 and 72, respectively.

The basic function of the metering stuffers is to receive the meat products from the transfer pump 10, and on demand deliver the product to casings on the stuffing horns for filling, immediate linking and subsequent processing in a multi-channel tunnel system. The rate of stuffing, as will be seen, will be uniform for all stuffers with a control means provided to permit servicing of each of the channels of the multi-channel unit. For ease and brevity of description, only two such units are illustrated, it being understood that in practice the demands of ten metering stuffers have been supplied by a single transfer pump and attended by a single operator. Therefore, only design practicability will limit the number of stuffers capable of being supplied by a single pump.

The metering stuffer or meat cylinder 72 is provided with a piston head 82 connected by a shaft 83 to a piston head 84 in a hydraulic cylinder 85 which arts as a motor to drive the piston head 82. The piston head 84 in the fluid motor or cylinder 85 is reciprocated by admission of fluid through ports 86 and 87 at opposite ends of the cylinder 85. Each of the ports 86 and 87 function as alternate inlets and outlets and is connected through lines 88 and 89 respectively to a source of hydraulic pressure through a suitable valving arrangement as will be seen.

The metering stuffer or meat cylinder 71 is provided with motivating hydraulic cylinder 91 which is driven between fixed limits by fluid entering and leaving hydraulic lines 92 and 93. In the condition shown, the line 89 serves as the return line while hydraulic fluid is being supplied through line 88 to drive the meat cylinder 72 towards the meat valve 70. In meat cylinder 71, hydraulic fluid is being returned in a controlled fashion via line 93 as the meat cylinder 71 is being filled from the transfer pump 10. The details of the filling and co-operation between the transfer pump 10 and meat cylinders 71 and 72 will be given in conjunction with the description of the operation.

Each of the meat cylinder or metering stuffers 71 and 72 is provided with a limit switch 94 and 95 respectively, which is operated by engagement with the piston head within the meat cylinder. The limit switches 94 and 95 are electrically connected through a line 96 to a bank of signal lights 97 operated from a 24 volt source. Each limit switch functions to turn on the indicating lights when the meat cylinder 71 or 72 is full retracted, indicating that the meat cylinder is filled and stuffing may commerce.

The meat cylinders 71 and 72, which may be more accurately referred to as metering stuffers, function to deliver the product at a constant rate. Any errors in metering must be maintained as an over-fill to meet the minimum weight of each package. The volumetric capability of the system and the cost of the product being comparatively high makes slight errors in metering rates significant from the cost standpoint, which errors can be avoided or kept at an absolute minimum in the present system. The independence of the meat cylinders of stuffers 71 and 72 of each other is apparent in the drawing in that the stuffer 71 is undergoing filling while the stuffer 72 is delivering the product to the stuffing horn 81. The valving for each metering stuffer is such that filling cannot commerce until the transfer pump 10 is operating at a predetermined and pre-set level of pressure. This positively precludes the possibility of a vacuum build-up within the meat cylinder or stuffer 71 or 72 should the piston therein retract without an adequate supply of product to fill the vacated spaced. Accordingly, voids are eliminated.

The meat cylinders or stuffers 71 and 72 are of uniform design and therefore in the interest of brevity, detailed description will be limited to the cylinder 71 which includes a cylindrical body 100 having end caps 101 and 102 which are threadably received on the body. End cap 101 is joined to a conduit 103 which cooperates with the main body of the meat valve 70 to allow the passage of the product into and out of the cylinder 100. A piston head 104 is joined to a piston rod 105 which extends through end cap 102 into a hydraulic cylinder 106 terminating in a piston head 107 which is reciprocable within the cylinder 106. The cylinder 106 is provided with inlet and outlet ports 108 and 109 at opposite ends to permit reciprocation of the piston 107 by the admission of fluid on opposite sides thereof. Under the conditions shown, variable volume pump 125 is supplying fluid to one end of the piston to control its rearward movement during filling.

In the lower left-hand corner of FIG. 1 is shown the control system for operating the individual meat cylinders or stuffers 71 and 72. The control system permits the operator to control the position of the meat valve 70 to initiate stuffing from and filling of the stuffers 71 and 72 which, under normal circumstances, is done sequentially so that a casing can be put on one stuffing horn while the stuffer is re-filling and the adjacent metering stuffer is metering the food product into a casing.

The control system includes a gear box with independent variable volume metering pumps all of which are represented in block diagram form and indicated by the reference 110. Each pump permits control of flow to the individual cylinders 85 and 106. One cylinder is used for each stuffer so in the illustrated form, a two-piston axial pump would be satisfactory, however, it is contemplated that a bank of ten channels of stuffers may be used with a single transfer pump. The additional eight cylinders would be provided with a control arrangement similar to that which will be described for the stuffers shown. Each of the pumps is provided with a variable stroke for volume control with power to each of the pumps being supplied by a synchronous speed motor to eliminate any variations which could cause metering errors.

The hydraulic fluid from each of the variable volume metering pumps is supplied through rigid lines 111 and 112 to two zero leakage, rotary plate, pre-positioned spring centered four-way valves 113 and 114 which are of uriform design. Valve 113 is mounted in tandem with two other control valves 115 and 116 all of which are operated by an air cylinder 117 through a mechanical type connection. In the position shown, the line 111 is in communication with line 88 to supply metered amounts of hydraulic fluid from the variable volume metering pump 110 into the fluid motor or cylinder 85 driving the stuffer 72.

The air cylinder 117 is controlled by an operator controlled air valve 118 which is a three positioned four-way valve, mounted so as to be accessible to the operator of the stuffing system. The valve 118 is provided with a manual operator 120 which permits the same to be selectively shifted to any one of the three positions. In the center position the lines 121 and 122 permit the air in the cylinder 117 to be bled off, allowing the spring centered valves 113, 115 and 116 to assume a neutral position, in which the hydraulic fluid from each of the variable volume metering pumps is bypassed while the meat valve 75 remains in its last position.

Valve 116 controls the hydraulic cylinder 77 which shifts the meat valve 75 to the desired position, while valves 113 and 115 serve to actuate and reverse the hydraulic cylinder 85 which operates the stuffer 72. Hydraulic fluid to operate the meat valves 74 and 75 as well as for reversing the hydraulic motors 106 and 85 is provided by a dual pressure compensated variable volume vane pump 125 and 126 both of which are driven by a common motor 127. Both pumps 125 and 126 draw hydraulic fluid from a common supply tank 128 through line 129 with a built-in relief system in each pump vented through the conduit 130 shown in dotted lines. The output of pump 126 is piped through line 131 containing an accumulator 132′ to absorb the shock of shifting the valve 116 which operates the cylinder 77 to shift the meat valve 75. The output line 131 from the pump 126 is also connected to control valve 132 which operates meat valve 74.

Pump 125 provides lower pressure oil through line 133 to a solenoid operated two-way valve 134 operated by a solenoid 135. The valve 134 controls flow through line 136 which is connected through is reversing valve 115 to the hydraulic cylinder 85 driving the stuffer 72. A reversing valve 137 corresponding to the reversing valve 115 is also supplied through the line 136. Reversing valve 137 communicates through line 92 with the hydraulic cylinder 106 driving the stuffer 71. The solenoid 135 is operated manually by the push button switch 140 which is wired in parallel with a pressure switch 141 in the hydraulic supply to the tranfser pump. When ten stuffers are provided on a single manifold, ten such reversing valves will be supplied by the hydraulic line or manifold 136. In the diagram, vave 137 utilizes the oil supply from the manifold line 136 for backing up the piston 104 in the stuffing cylinder 71 through feeding pressurized hydraulic fluid via line 92. The pressure and volume of pump 125 are set to match the reverse speed of the piston 104, however, if stuffing cylinder 71 tries to reverse faster than the incoming supply, pressure requirements become higher, causing the pressure compensating pump to automatically reduce its volume accordingly to slow down the reversing speed. As was the case on line 131 for pump 126, the line leading from pump 125 is provided with an accumultaor 142 which minimizes the pressure shock when the control valves are operated to change direction or the like. During the filling cycle, the pump 126 supplies hydraulic fluid through line 131 and valve 132 to cause the meat valve 74 to shift to the position shown, blocking the outlet line leading to the stuffing horn 80 while simultaneously placing the conduit 103 in communication with the branch 73 leading to the manifold 26. The meat product may then be pumped through the manifold to the stuffing cylinder 71 while the operator is installing a new casing on the stuffing horn 80.

The condition of the stuffing cylinder 71 and associated meat valve 74 has been brought about through operation of valve 143 which is identical to valve 118 except that it services air cylinder 144 which generally corresponds to the air cylinder 117 in that its operates valves 132, 114, and 137 simultaneously. The valve 143 is illustrated as being in the fill position placing a shop air supply line 145 in communication with the cylinder 144 to actuate the attached valves downwardly. The opposite end of the cylinder 144 is vented through line 146 and valve 143 through a muffler arrangement 147 to the atmosphere.

The manual operator or piston rod 148 of the cylinder 144 is provided with a switch operator 150 which manually operates the single pole, single throw, normally open micro switch 151 which is wired in series with a single pole, double throw, normally closed micro switch 94 disposed at the rear of the stuffing cylinder 71. The resulting signal operates a 24 volt relay 153 which controls power flow from a 110 volt supply leading to the solenoid 41′ and operating the bypassing relief valve 40 on the transfer pump 10. The transfer pump 10 responds by building up meat pressure causing the pressure switch 141 to close, opening the two-way solenoid valve to effect reversing of the stuffing cylinder. Filling continues in the fashion shown in the stuffing cylinder 71 until the piston 104 contacts the operator on the switch 94 opening the contact, de-activating the relay 153 to bypass the transfer pump relief valve. With the normally open contacts now closed, the appropriate light in the indicator bank 97 signals the operator that filling is complete and stuffing may commence.

When the operator shifts the operator control valve 118 or 143, the single throw limit switch opens to preclude the relief solenoid from operating. At such time the indicating lamp in the bank 97 is turned off indicating that stuffing has started. Voltage for the lamps 97 and relay 153 is derived from a transformer 155 which provides a 24 volt supply for use in the exposed areas of the system such as the stuffers and control valves. With a low voltage system, installation of the wiring is simplified and the over-all safety of the system is enhanced. The main control of the transfer pump 10 utilizes signal voltages of 110 volts, however, this control is conveniently disposed remote from the product handling equipment so that the liberal use of water during clean-up is permissible.

Referring now to FIG. 2, a modified form of pump and stuffing arrangement will be described. It is contemplated that the stuffer shown in FIG. 2 may be used either with or independently of a multi-channel system. An example of the latter could include stuffing food products into cans or the like at a metered rate. In FIG. 2, the pump and hydraulically operated motor to drive the same are shown in schematic form. For convenience and brevity in description, like reference characters have been used to indicate like parts to those shown in the system of FIG. 1.

The control system design of FIG. 2 utilizes air controls to effect reversing through the use of the limit switches 52 and 54 and associated actuators 53 and 55 respectively, to maintain the hydraulic fluid physically spaced from the food product. Each of these limit switches control the pilot ports 62 and 63 of valve 64 which operates air cylinders 231 and 232 respectively thereby positioning hydraulic valve 230 controlling the fluid flow to the driving motor 16.

The hydraulic valve 230 supplies hydraulic fluid alternately to the ports 21 and 22 on the hydraulic cylinder 16 in order to effect the pumping motion. In the condition shown, the port 21 is vented to a tank through a line 233 and filter 234 into the supply tank 235. Air is supplied from a cross-over line 236 through the four-way air valve 64 to the pilot cylinder 231. This places the pressurized supply 237 in communication with the port 22 to feed high pressure fluid to the chamber on the right-hand side of the piston 19 moving it towards the left-hand side of the cylinder 16.

Sufficient hydraulic pressure to effect such movement is provided by a motor 240 driving tandem hydraulic pumps 241 and 242 which draws hydraulic fluid through the inlet line 243 from the supply 235. Check valves 244 and 245 are provided in each of the lines from the pumps 241 and 242, respectively. An unloading valve 246 is provided in the low pressure line which dumps hydraulic fluid back to the supply when a predetermined pressure is exceeded. A relief valve 247, set to operate at a higher pressure, is provided in the high pressure line. A second valve 248 is operated by a solenoid 249 and corresponds in operation to the solenoid operated valve 40 in FIG. 1 providing a manually operated relief.

The stuffing pump system of FIG. 2 operates like the embodiment shown in FIG. 1. In both instances, a small pressure compensating pump 250 and operating motor have been provided in each of the stuffing systems to maintain the meat under pressure at all times and permit instant pressure build-up to the operating pumping pressures when a demand is made for the product. The function of this pump is to eliminate rebound as when the high pressure to the motor 16 is relieved. The low pressure pump 250 holds the meat under a pressure of about 50 p.s.i. Accordingly, when the solenoid 249 operates the valve to relieve the high pressure fluid, the cylinder will remain under the hydraulic pressure applied by the pump 250.

In operation, pressure is built up by the pumping systm 237 and the four-way valve 230 is operated to an appropriate position to direct high pressure fluid into the cylinder 16 on the appropriate side of the piston 19 to effect a traverse of the pumping piston 14. As the pumping piston 14 passes the throat opening 28, meat is trapped and on subsequent piston movement is forced out one of the outlets 22 or 23 into the manifold 26. The piston 14 must travel to the end of the cylinder or to its full limit in order to depress the limit probe 55 on the limit valve 54 or the limit probe 53 on the valve 52 depending on the direction of movement. Depending upon which limit switch is actuated, the four-way air valve is operated through pilot cylinders 62 and 63 to effect a reversing and the pump 10 will continue to operate so long as hydraulic pressure is made available. An accumulator 251 may be provided on the hydraulic line to lessen the shock of shifting of the valve 230, initiating pumping or the like.

Referring now to FIG. 3, one form of meat valve and stuffing cylinder arrangement which can be used is shown at 260. The stuffing cylinder 261 is provided with an end cap 262 which is joined to a meat valve sleeve 263. The meat valve is provided with an inlet opening 264 and an outlet 265 and has a valve element 266 slidably received therein. An operating rod 267 is joined by means of a pin 268 to a bifurcated fork member 269 on a rod 270. The piston rod 270 is driven from a cylinder 271 corresponding in operation to the cylinders 76 and 77 in FIG. 1.

The valve element 266 is shown in the stuffing position so that the piston head 272 in the stuffing cylinder 261 is moving in the direction of the arrow to force the meat product through the valve and out the opening 265 which is joined to a stuffing horn (not shown). The piston head 272 is driven by a rod 273 which is threadably joined in the head and locked thereto by means of a lock nut 274. The opposite end of the piston rod 273 extends into a hydraulic cylinder 275 which is driven between limits in the same fashion as described with respect to cylinders 85 and 106 in FIG. 1. Accordingly, the hydraulic cylinder 275 is only shown fragmentarily.

The stuffing cylinder and meat valve arrangement shown at 260 in FIG. 3 is mounted on a framework 276 and provided with self-retaining type pins or bolts for joining the parts wherever possible to permit easy disassembly. The fittings are standard acme sanitary threads to permit easy assembly and disassembly for clean-up by workmen having a low level of mechanical skill. The valve element 266 is maintained properly positioned by means of the guide pin 278. When the stuffing cylinder is moved to the end cap 262 the meat valve element 266 is operated by the cylinder 271 towards the end cap 277. This moves the tubular part 280 of the valve element 266 into position to cover the outlet opening 265 leading to the stuffing horn. During such occurrence, the tubular part of the valve 280 is moved away from the opening 264 and the meat product may enter the chamber of the meat stuffing cylinder 261 with filling accomplished in the manner described in connection with the stuffing cylinders in FIGS. 1 and 2. On completion of the filling cycle, the meat valve 266 may then be shifted and stuffing may commence out through the outlet opening 265.

From the foregoing it is obvious that the present stuffing system provides the advantages noted with a relatively simplified form of control system which will not require special skilled attention during clean-up operations. One operator may easily handle ten stuffing channels and produce a uniformly stuffed, attractive product having good particle definition which may be packaged numerically with little, if any, overage.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:
1. A multi-channel stuffing system comprising a pump means adapted to pump a food product to a plurality of stuffers through a common manifold, each of said stuffers including a stuffing cylinder having a piston disposed for reciprocation therein, a hydraulic motor adapted to reciprocate said piston in a said stuffing cylinder, a product control valve controlling flow of said food product from said manifold into the stuffing cylinder of each of said stuffers, said product control valve also controlling the flow of said food product out of said stuffing cylinder of each of said stuffers into a stuffing horn, circuit means for controlling the metering of food products from the stuffing cylinder of one said stuffers at a predetermined and uniform rate, said circuit means permitting simultaneous independent control of the filling of at least one or the other of said stuffers, said circuit means including stuffer filling means responsive to a product control valve being in a filling position to initiate pumping by said pump means to fill the associated stuffing cylinder, and means including a metering pump for driving the hydraulic motor which reciprocates said piston to cause filling of said stuffing cylinder at a uniform rate to eliminate voids.

2. A stuffing system comprising a pump means adapted to pump a food product to a stuffer through a manifold, said stuffer including a stuffing cylinder having a piston disposed for reciprocation therein, a hydraulic motor adapted to reciprocate said piston in said stuffing cylinder at a uniform and predeterminable rate to meter said food product therefrom, a product control valve for controlling flow of said food product from said manifold into said stuffing cylinder of said stuffer, said product control valve also adapted for controlling the flow of said food product out of said stuffing cylinder into a stuffing horn, a control means for controlling the metering of said food product from the stuffing cylinder at a predetermined and uniform rate, said control means including means for controlling the filling of said stuffing cylinder when said product control valve is in a filling position, said last named means causing said pump means to initiate pumping to fill said stuffing cylinder at a uniform rate to eliminate voids and the like during filling, and metering pump means driving the hydraulic motor reciprocating said piston in said stuffing cylinder whereby said product may be metered to said stuffing horn through said product control valve at a uniform rate, said pump means being responsive to a demand made for said product at said stuffing cylinder through said last named means.

3. The stuffing system of claim 2 wherein said means for controlling the filling of the stuffing cylinder is operative during filling of said stuffing cylinder to control the rate of filling to eliminate voids and the like.

4. A multi-channel stuffing system comprising a pump means adapted to pump a food product to at least two stuffers through a common manifold, each of said stuffers including a stuffing cylinder having a piston disposed for reciprocation therein, a hydraulic motor adapted to reciprocate said piston in each of said stuffing cylinders, a product control valve controlling flow of said food product from said manifold into said stuffing cylinder of each of said stuffers, said product control valve also controlling the flow of said food product out of said stuffing cylinder of each of said stuffers, a control system for controlling the rate of movement of said hydraulic motor thereby to control the rate of flow of food products from the stuffing cylinder of one of said stuffers whereby said product may be metered therefrom at a predetermined and uniform rate while simultaneously and uniformly controlling the rate of filling of the other of said stuffers, said control system including means operative when the product control valve of the other of said stuffers is in a filling condition to initiate controlled pumping by said pump means whereby said stuffers may be operated for alternatively or simultaneously filling and stuffing with substantial uniformity.

5. A multi-channel metering system for use in stuffing food products into containers, casings and the like at a uniform and predeterminable rate, said system including a transfer pump having outlet means, a manifold connected to said outlet means, means to operate said transfer pump so as to pump said food product on demand into said manifold, a meat valve, a plurality of stuffing cylinders each having a reciprocating piston and a product supply opening selectively in communication with the meat valve, said meat valve having an inlet in communication with said manifold and an outlet communicating with a stuffing horn, hydraulic means operating said meat valve so as to control the flow of said product to and from said stuffing cylinder through said inlet and outlet, means to reciprocate said piston when the cylinder is filled with the product so as to discharge the product through said outlet during a stuffing cycle, and means to control the speed of traverse of said piston during the stuffing cycle whereby food products will be metered to said stuffing horn at a uniform and predeterminable rate.

6. The multi-channel metering system of claim 5 wherein said means to control the speed of traverse of said stuffing cylinder piston during the stuffing cycle includes a variable volume metering pump and operator control valve means controlling the flow of fluid from said metering pump, said operator control valve means simultaneously controlling said meat valve to place said stuffing cylinder in communication with said stuffing horn at the initiation of said stuffing cycle.

7. The multi-channel metering system of claim 5 wherein said means to control traverse of said piston during the stuffing cycle includes valve means to prevent filling of said stuffing cylinder by said transfer pump until said transfer pump is operating at a predetermined level whereby to avoid vacuum build-up.

8. A multi-channel stuffing system comprising a pump means operative to pump a food product to a plurality of stuffers through a common manifold, each of said stuffers including a stuffing cylinder having a piston disposed for reciprocation therein, a motor adapted to reciprocate said piston in each of said stuffing cylinders, a product control valve controlling the flow of said food product from said manifold into said stuffers, a valve controlling the flow of said food product out of each of said stuffers, a control system for controlling the rate of movement of said motor thereby to control the rate of flow of said food products from the stuffing cylinders of one of said stuffers whereby said product may be metered therefrom at a predetermined and uniform rate while simultaneously and uniformly controlling the rate of filling of the other stuffers, said control system including means operative when the product control valve of another of said stuffers is in a filling condition to initiate controlled pumping by said pump means whereby said stuffers may be operated for alternatively or simultaneously filling and stuffing with substantial uniformity.

References Cited

UNITED STATES PATENTS

| | | | |
|---|---|---|---|
| 2,805,444 | 9/1957 | Hensgen et al. | 17—39 |
| 3,009,195 | 11/1961 | Dixon et al. | 17—39 |
| 3,042,964 | 7/1962 | Rosenthaler | 17—35 |
| 3,108,318 | 10/1963 | Miller et al. | 17—39 |
| 3,162,894 | 12/1964 | Hutchins et al. | 17—35 |

FOREIGN PATENTS 720,478  12/1931  France.

OTHER REFERENCES

Grob: German printed application No. 1,025,750, pub. Mar. 6, 1958.

LUCIE H. LAUDENSLAGER, *Primary Examiner.*

U.S. Cl. X.R.

17—39